United States Patent
Warner

[15] 3,692,948

[45] Sept. 19, 1972

[54] TELEPHONE QUEUING CIRCUIT

[72] Inventor: Wesley John Warner, Westmount, Quebec, Canada

[73] Assignee: Western Electric Company Limited, Montreal, Quebec, Canada

[22] Filed: Dec. 24, 1970

[21] Appl. No.: 101,273

[52] U.S. Cl. ..............................179/18 FA, 179/27 D

[51] Int. Cl. ..............................H04q 3/64

[58] Field of Search...179/27 D, 27 FH, 18 F, 18 FA, 179/18 AB

[56] References Cited

UNITED STATES PATENTS 3,328,531 6/1967 Platt et al.................179/27 D 3,334,191 8/1967 Arseneau et al.........179/27 D 3,275,754 9/1966 Howell et al.............179/27 D

*Primary Examiner*—Thomas W. Brown

*Attorney*—Westell & Hanley

[57] ABSTRACT

An analog method and circuit for queuing incoming telephone calls and releasing the calls in order of age. A timing station is provided for each call circuit, in which a voltage varies as the time, relative to calls at other stations, a call has been waiting at that particular station. When an operator is ready to service a call, all the station voltages are changed equally and in the same sense as the voltage variations, and the first station to reach a predetermined voltage level is detected.

8 Claims, 4 Drawing Figures

INVENTOR.
WESLEY JOHN WARNER
BY Westell & Hanley

INVENTOR.
WESLEY JOHN WARNER
BY
Westell & Hanley

TELEPHONE QUEUING CIRCUIT

The present invention relates to a call system and more particularly to a system for queuing incoming calls whereby they are served in the order of their arrival.

Where requests for service cannot be served immediately, systems have been devised for delaying the calls in a common pool. Ideally such delayed requests should be served in the time order of their arrival and this means that the common pool should be an ordered queue. In the past pure ordered queues have not been used because they require a large number of memory bits (typically relays) to store the queuing information in digital form. Consequently various forms of rotating preference have been used to approximate an ordered queue. Rotating preference methods insure that all requests are eventually serviced but they have the failing that a request can be served far out of sequence and thus severely delayed. For certain applications such an approximation system is not acceptable.

It is an object of the present invention to provide an improved method and circuit for queuing incoming calls and releasing the calls in order of age. This is accomplished by providing, at a different station characteristic of each call circuit, a voltage varying as the time, in relation to calls at other stations, a call has been waiting at that particular station, the voltages varying in the same sense for all the stations. When a call may be serviced, each of the station voltages is changed in the same sense as the voltage variations, the change being equal for all stations, and the first station to have its changed voltage reach a predetermined level is detected.

An example embodiment of the invention is shown in the accompanying drawings in which.

Figure 1:
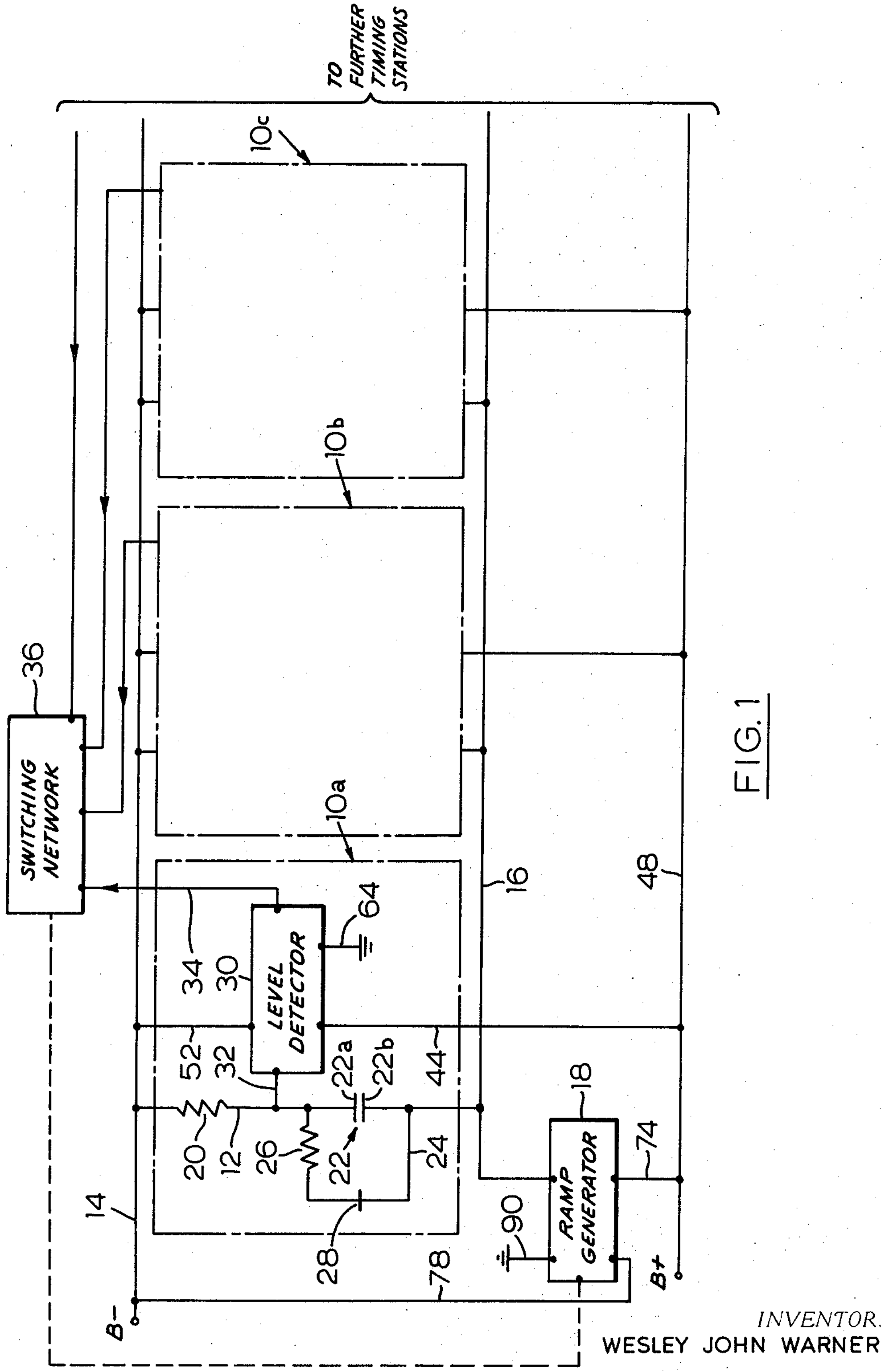
FIG. 1 is a schematic diagram showing a plurality of timing stations forming a queuing circuit of the invention.

In the circuit of FIG. 1 a plurality of timing stations 10 are provided, each timing station being associated with a different call circuit (not shown). Each timing station 10 comprises a line 12 connected at one end to a common line or bus 14 which leads from a negative direct current voltage source B−, and connected at the other end to another common line or bus 16 which leads from a ramp generator 18. A resistor 20 is connected in series in line 12 and a capacitor 22 is also connected in series in line 12 on the side of resistor 20 remote from bus 14, one plate 22a of the capacitor being connected through line 12 and bus 14 to voltage source B− and the other plate 22*b* being connected through line 12 and bus 14 to ramp generator 18. Capacitor 22 is shunted by a line 24 having in series a resistor 26 and normally closed controlling contacts 28 of a relay (not shown). The telephone handset of the call circuit associated with timing station 10 is designed and connected so that contacts 28 are closed when the handset is on the hook, thus keeping the contacts of the relay in their normally closed position until the handset is used.

Figure 2:
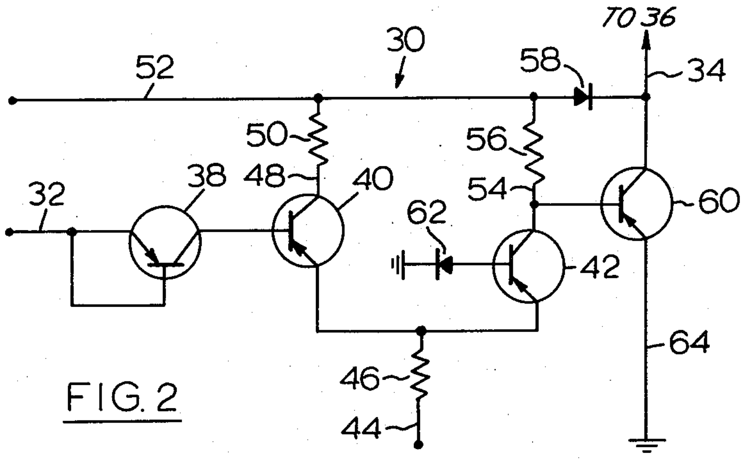
FIG. 2 is a schematic diagram of the circuit of a level detector used in each timing station of FIG. 1.

A level detector 30 is provided for each timing station 10. Any level detector well known to those skilled in the art can be used but a preferred detector is a differential detector-amplifier as shown in FIG. 2 of the drawings. Detector 30 has an input line 32 connected to line 12 between resistor 20 and shunt 24 while output line 34 of the detector is connected to a switching network 36 common to all timing stations 10. As seen in FIG. 2 of the drawings, input line 32 of detector 30 is also connected to the emitter of a transistor 38 acting as a low leakage diode having its base connected to its emitter and its collector connected to the base of a transistor 40. The emitter of transistor 40 and the emitter of a transistor 42 are connected together and to a line 44 which is connected through a series resistor 46 to a common line or bus 48 (see FIG. 1) leading from a positive direct current voltage source B+. The collector of transistor 40 is connected by a line 48 through a series resistor 50 to a line 52 which is connected to bus 14 and source B−. Similarly the collector of transistor 42 is connected by a line 54 through a series resistor 56 to line 52. Line 52 is connected to output line 34 through a diode 58 poled to conduct when line 34 is more negative in potential than line 52. The collector of transistor 42 is also connected to the base of a transistor 60. The base of transistor 42 is connected to ground through a diode 62 poled to conduct when the base is positive. The emitter of transistor 60 is connected by a line 64 to ground and the collector of transistor 60 is connected by output line 34 to switching network 36.

Figure 3:
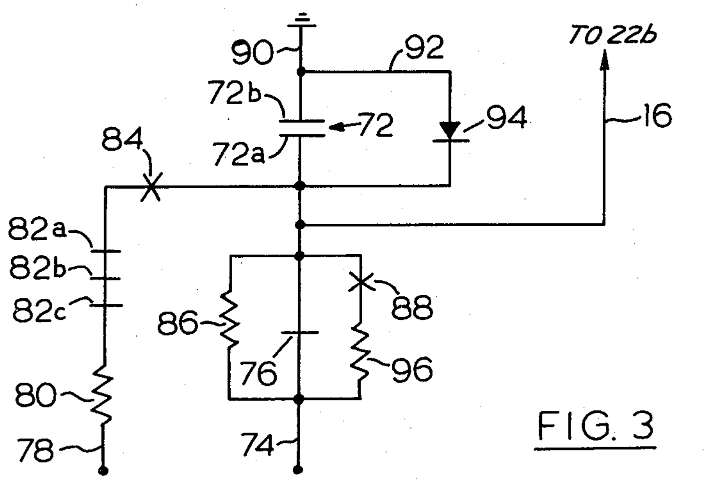
FIG. 3 is a schematic diagram of the circuit of a ramp generator shown in FIG. 1.

FIG. 3 of the drawings shows in detail the circuit of ramp generator 18. In ramp generator 18, one plate 72*a* of a capacitor 72 is connected to bus 48 and voltage source B+ by a line 74 having in series a pair of normally closed contacts 76 of a relay (not shown) designed to be operated when switching network 36 is ready to accept a call. Plate 72*a* of capacitor 72 is connected to bus 14 and voltage source B− by a line 78 having, connected in series, a resistor 80 and a plurality of pairs of normally closed contacts 82. Each pair of contacts 82 is connected to a different relay (not shown) of an individual calling circuit, the relay being designed to be operated when a call on that particular call circuit is accepted by switching network 36. Also connected in series in line 78 are a pair of normally open contacts 84 of a relay (not shown) connected with a control circuit and designed to close say 20 milliseconds after the opening of contacts 76. A resistor 86 is connected in parallel with normally closed contacts 76 in line 74. Also connected in parallel with contacts 76 are a pair of normally open contacts 88 of a relay (not shown) connected with a control circuit and designed to close say 20 milliseconds after the opening of any pair of contacts 82. Bus 16 connects plate 72*a* of capacitor 72 with capacitor 22 of each timing station 10. Plate 72b of capacitor 72 is grounded through line 90. Capacitor 72 is shunted by a line 92 having in series a diode 94 poled to conduct when plate 72*a* is negative. A resistor 96 is connected in series with relay contacts 88.

In the operation of the device, the lifting of the handset of the call circuit associated with a particular timing station 10 opens contacts 28 of that station to remove shunt 24 from capacitor 22, leaving a positive charge on plate 22*a* equal to voltage source B+. Immediately after the opening of contacts 28, plate 22*a* of capacitor 22 begins to charge in a negative going direction through trickle charge resistor 20 which is a very high resistance (in the order of 82 megohms) to provide for a predetermined slow leakage. As an example, for a value B+ = +12 volts and B− = −24 volts, over a period of approximately 3 minutes the positive charge on plate 22*a* of a capacitor 22 in the order of 4.5 microfarads will reduce to 0 voltage.

The negative going charge on plate 22*a* of capacitor 22 appears at the emitter of diode 38 of level detector 30. Comparing a group of timing stations 10, the voltage at the emitter of diode 38 will be smallest in that circuit where contacts 28 have been open longest, indicating the caller waiting longest to be served by switching network 36.

When switching network 36 is ready to accept a call, contacts 76 of ramp generator 18 are opened to alter the path from voltage source B+ to pass through resistor 86 which is of high ohmic value to provide a trickle charge to plate 72*a* of capacitor 72 to compensate for leakage under normal charge conditions. Almost immediately after the opening of contacts 76 (say 20 milliseconds) relay contacts 84 are closed to produce a steep negative going ramp charge on plate 72*a* of capacitor 72. This ramp appears on bus 16 and on plate 22*b* of the capacitor 22 of each timing station 10. The change in voltage on plate 22*b* of capacitor 22 causes a current to flow in diode 38, which acts to increase the negative voltage at the base of transistor 40 of the timing station having the smallest voltage. Normally transistor 40 is off, transistor 42 is on, and transistor 60 is off. At a predetermined level (say 0 volts) the negative going voltage at the base of transistor 40 turns that transistor on, which increases the drop in voltage across resistor 46, turning off transistor 42. The base of transistor 60 then goes negative (from line 52) and turns that transistor on, causing a start signal to appear on output line 34.

Figure 4:
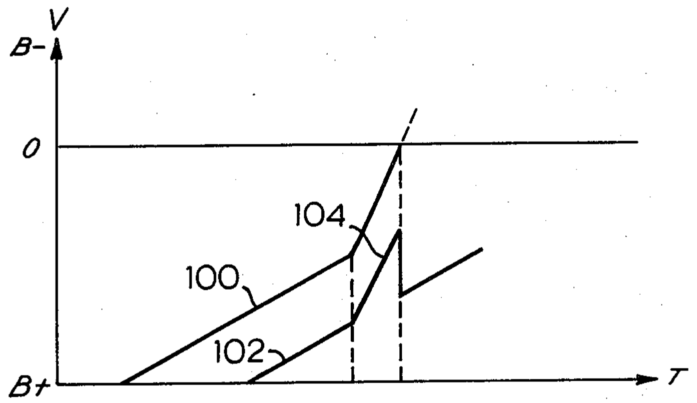
FIG. 4 is a graph showing the time-voltage relationship of the capacitors of two timing stations of FIG. 1 in which calls have been received and scanned.

As seen in FIG. 4 of the drawings, the voltage on capacitor 22 drops over a predetermined time span towards a datum which triggers the start signal. Thus the higher the voltage on capacitor 22, in other words the later the time of arrival of an incoming call associated with timing station 10, the later transistor 60 will start. By this means switching network 36 is able to recognize the call which has been waiting the longest.

On accepting or serving the earliest call (or queuing call on any of the incoming lines) contacts 82 in ramp generator 18, of that relay associated with that particular telephone call circuit, are opened to disconnect plate 72*a* of capacitor 72 from voltage source B− to stop capacitor 72 from discharging. The opening of contacts 82 causes contacts 88 to close which creates a shunt around opened contacts 76 and restores the voltage on plate 72*a* of capacitor 72 to its original B+ value. This in turn restores the same positive voltage to capacitor 22 in each timing station 10.

For those calls still queuing, the voltage appearing at the base of diode 38, in each of the associated timing stations 10, will return to its previous voltage level (less the leakage during the pulse time) to continue its negative going rate towards the datum. In an illustrative example shown in FIG. 4 of the drawings, the time-voltage relationship of capacitor 22 in timing station 10a storing the first call is denoted by ramp line 100 and the time-voltage relationship of capacitor 22 in timing station 10b storing the second call is denoted by ramp line 102. When switching network 36 is ready to accept a call, relay contacts 76 are opened and relay contacts 84 are immediately closed, thus increasing the slope of negative going ramps 100 and 102 by adding the negative going ramp voltage. Because the call represented by ramp line 100 has been queuing longer, the voltage appearing at diode 38 in timing station 10*a* will reach datum first and detector 30 of timing station 10a will produce a start signal first. When switching network 36 accepts the call associated with timing station 10*a*, one set of relay contacts 82 is opened and relay contacts 88 are immediately closed, thus restoring the voltage on plate 22b of capacitor 16 in timing station 10*b* to its original B+ value and bringing the voltage on plate 22*a* of that capacitor back to its original negative going ramp line 102. It will be seen that the operation of ramp generator 18 in this manner creates a pulse 104 along bus 16 which appears on plate 22*b* of capacitor 22. On completion of the call associated with timing station 10*a*, relay contacts 28 are closed and capacitor 22 is shunted, ready to begin timing the next call on that call circuit. When the first call has been completed and switching network 36 is ready to serve the second call the same sequence is repeated.

Shunt 92 and diode 94 protect capacitor 72, if it is an electrolytic capacitor, against reverse bias. Resistors 26 and 96 are of low ohmic value and protect capacitors 22 and 72 respectively against surges. Resistor 80 governs the negative going slope of pulse 104 superimposed on capacitors 22 by ramp generator 18; this slope must be greater than the negative going slope of ramp line 100 or 102.

A differential detector 30 is preferably employed, rather than a conventional level detector, to prevent undue disturbance of the voltage on each capacitor 22 when calls are received close together in time. For this purpose the use of a high gain emitter-follower transistor 40 is also preferable. Switching network 36 may be designed, in a manner well known in the art, to deal with seizures simultaneously received by the network.

The time-voltage ratio of the leakage through resistance 20 is, in the present embodiment, designed to hold a call in timing station 10 for three minutes before the negative going voltage on capacitor 22 reaches the datum (0 volts). After a time lapse of three minutes the call will still be held but there will be no way to determine its place in the queue.

To prevent disturbance of other call storage circuits, the voltage on bus 16 should return quickly to its normal value after a ramp generator pulse 104 has been initiated and there should be a maximum pulse time of say 800 milliseconds. This maximum delay (i.e. the time lapse in allowing the voltage drop for a new call to reach datum) governs the slope of the negative going ramp common to all capacitors 22 because if the ramp is too steep or fast it will result in a loss of queuing accuracy (the calls reaching datum too close together in time to enable switching network 36 to distinguish one from another).

I claim:

1. A method of queuing and servicing incoming telephone calls in the order of their waiting time, oldest first, comprising the steps of:

providing, at a plurality of stations each characteristic of a separate call circuit, a voltage at each station varying, in the same sense for all said stations and as the time a call at that station has been waiting in relation to the time that calls at others of said stations have been waiting;

causing a change in each of the station voltages in said same sense and at a faster rate than said voltage variation, said voltage change being the same in each of said stations; and detecting the first of said stations the changed voltage of which reaches a predetermined level.

2. A method as claimed in claim 1 with the added step, responsive to the acceptance of a call, of returning said station voltages to the value which said station voltages would have reached absent said faster rate change.

3. A method as claimed in claim 1 with the added step, responsive to the termination of an accepted call, of returning the voltage, at that station having its call accepted, to its level at zero waiting time.

4. A method as claimed in claim 1 in which the voltage at each station is varied by current leak through a resistor of high ohmic value to a capacitor and employing a level detector to detect the changed voltage on the capacitor.

5. A queuing circuit for servicing incoming telephone calls in the order of their waiting time, oldest first, comprising:

a plurality of stations each characteristic of a separate call circuit;

means for producing a voltage at each of said stations varying, in the same sense for all said stations and as the time a call at said station has been waiting in relation to the time that calls at others of said stations have been waiting;

means for changing each of the station voltages in said same sense and at a faster rate than said voltage variations, said voltage change being the same in each of said stations; and means for detecting the station the changed voltage of which first reaches a predetermined level.

6. A circuit as claimed in claim 5 in which the means for producing the varying voltage at each of said stations comprises a capacitor having one plate connected with a first voltage source, the circuit being constructed, designed and connected so that the plate will maintain a voltage of predetermined value on initiation of a call on said input line, and means to vary the voltage on the other plate of the capacitor at a predetermined rate from the time said call has been initiated.

7. A circuit as claimed in claim 6 in which the means to vary the voltage on said other plate of the capacitor comprises a second voltage source of opposite potential to said first voltage source and connected to said plate through a first resistor of high ohmic value.

8. A queuing circuit for servicing incoming telephone calls in the order of their waiting time, comprising:

a plurality of stations each characteristic of a separate call circuit;

a voltage source of positive potential;

a voltage source of negative potential;

in each of said stations (a) a capacitor having one plate connected with said positive voltage source and the other plate connected with said negative voltage source, (b) a resistor of high ohmic value connected in series with said negative voltage source and in series with said other plate of the capacitor, (c) means to shunt the capacitor when the station is inoperative and to remove the shunt when an incoming call is initiated with respect to the station whereby a negative going voltage is produced on said other plate, and (d) means for detecting when the negative going voltage on said other plate reaches a predetermined level; and actuable means, common to all said stations, for changing the voltage on said one plate in a negative going direction at a faster rate than said negative going voltage on said other plate and in the same sense.

* * * * *

UNITED STATES PATENT OFFICE
CERTIFICATE OF CORRECTION

Patent No. 3,692,948 Dated September 19, 1972

Inventor(s) WESLEY JOHN WARNER

It is certified that error appears in the above-identified patent and that said Letters Patent are hereby corrected as shown below:

On the cover sheet [73] the name of the assignee should read -- Northern Electric Company Limited --.

Signed and sealed this 15th day of May 1973.

(SEAL)
Attest:

EDWARD M.FLETCHER,JR.
Attesting Officer

ROBERT GOTTSCHALK
Commissioner of Patents